United States Patent
Song

(10) Patent No.: US 11,305,751 B2
(45) Date of Patent: Apr. 19, 2022

(54) VEHICLE AND CONTROLLING METHOD THEREOF

(71) Applicants: Hyundai Motor Company, Seoul (KR); Kia Motors Corporation, Seoul (KR)

(72) Inventor: Minseok Song, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 262 days.

(21) Appl. No.: 16/543,885

(22) Filed: Aug. 19, 2019

(65) Prior Publication Data
US 2020/0324754 A1 Oct. 15, 2020

(30) Foreign Application Priority Data
Apr. 11, 2019 (KR) .................. 10-2019-0042605

(51) Int. Cl.
*B60W 20/00* (2016.01)
*B60K 6/387* (2007.10)

(52) U.S. Cl.
CPC .............. *B60W 20/00* (2013.01); *B60K 6/387* (2013.01); *B60W 2510/244* (2013.01); *B60W 2520/10* (2013.01); *B60W 2710/02* (2013.01); *B60Y 2200/92* (2013.01)

(58) Field of Classification Search
CPC ............. B60W 20/00; B60W 2520/10; B60W 2710/02; B60W 2510/244; B60W 2710/021; B60W 2540/10; B60W 2552/15; B60W 2510/305; B60W 20/12; B60W 20/11; B60W 20/20; B60W 10/02; B60W 10/06; B60W 10/08; B60W 20/15; B60W 2510/242; B60W 2510/06; B60W 2530/13; B60W 20/13; B60W 10/26; B60W 20/40; B60W 40/105; B60K 6/387; B60K 6/442; B60Y 2200/92; B60Y 2200/91;
(Continued)

(56) References Cited

U.S. PATENT DOCUMENTS

2014/0121875 A1* 5/2014 Jang ...................... B60W 20/10
701/22

OTHER PUBLICATIONS

M. Khodabakhshian, L. Feng and J. Wikander, "Improving fuel economy and robustness of an improved ECMS method," 2013 10th IEEE International Conference on Control and Automation (ICCA), 2013, pp. 598-603, doi: 10.1109/ICCA.2013.6564946.*

* cited by examiner

*Primary Examiner* — Brian P Sweeney
(74) *Attorney, Agent, or Firm* — Mintz Levin Cohn Ferris Glovsky and Popeo, P.C.; Peter F. Corless

(57) ABSTRACT

A vehicle is provided to include an engine, a motor operating with electrical energy of a battery, an engine clutch for switching between an operation mode including an EV mode for transferring power generated by the motor to wheels and an HEV mode for transferring power generated by the engine and the motor to the wheels, and a controller. The controller collects status information from the motor and the engine, determines an equivalence factor based on status information of the battery and load information using electrical energy of the battery and determines an operation mode in which energy consumption is minimized among a plurality of energy consumption amounts calculated based on the determined equivalent factor and the modes of the engine clutch.

16 Claims, 11 Drawing Sheets

(58) Field of Classification Search
CPC .......... Y02T 10/70; Y02T 10/62; B60L 58/13; B60L 58/18; B60L 2240/54
See application file for complete search history.

EV mode

HEV mode

VEHICLE AND CONTROLLING METHOD THEREOF

CROSS-REFERENCE TO RELATED APPLICATION(S)

This application claims the benefit of Korean Patent Application No. 10-2019-0042605 filed on Apr. 11, 2019, the disclosure of which is incorporated herein by reference.

BACKGROUND

1. Technical Field

The present disclosure relates to an electric vehicle and control method thereof, and more particularly, to a method of controlling an electric vehicle using an internal combustion engine and an electric motor as a power source.

2. Description of the Related Art

A vehicle may be classified into an internal combustion engine vehicle, a hybrid electric vehicle, and an electric vehicle based on the type of power source generating the driving force. The internal combustion engine vehicle is a type of vehicle that burns fossil fuels and generates power. To solve the problem of depletion of fossil fuels used as fuel for the internal combustion engine vehicles and environmental pollution problems, the hybrid electric vehicles and the electric vehicles are being developed. Hybrid electric vehicles (HEVs) may be classified as a parallel hybrid method, a series hybrid method, or a power-split hybrid method. The parallel hybrid method may be classified into a transmission mounted electric device (TMED) method and a flywheel mounted electric device (FMED) method.

The TMED HEV has two power sources, an engine and a motor, just like any other hybrid electric vehicle. However, the TMED HEV uses the power source in the electric vehicle (EV) mode when starting or during low speed driving, and the hybrid electric vehicle (HEV) mode during high speed driving or acceleration/hill climbing driving. Specifically, the TMED HEV uses only the motor as the power source when the required power is low, such as when starting or during low-speed driving (EV mode), and uses the motor and the engine together when the required power is high, such as during high-speed driving or acceleration/hill climbing driving (HEV mode).

Meanwhile, the hybrid electric vehicles use equivalent consumption minimization strategy (ECMS) logic to improve fuel economy. However, since the ECMS logic used in the conventional hybrid electric vehicles considers only a state of charge (SOC) of a battery, there is a limitation in using the TMED HEV having many mode transitions and a vehicle considering the driving behavior of a user.

SUMMARY

Therefore, the present disclosure provides a vehicle and controlling method thereof, which improves the fuel economy and reduces energy consumption to match a power distribution strategy performed by a TMED HEV by considering a variety of status information in addition to ECMS (Equivalent Consumption Minimization Strategy) logic.

In accordance with one aspect of the present disclosure, a vehicle may include an engine; a motor operating with electrical energy of a battery; an engine clutch for switching between an operation mode including an EV mode for transferring power generated by the motor to wheels and an HEV mode for transferring power generated by the engine and the motor to the wheels; and a controller configured to collect status information from the motor and the engine, determine an equivalence factor based on status information of the battery and load information using the electrical energy of the battery and determine an operation mode in which energy consumption is minimized among a plurality of energy consumption amounts calculated based on the determined equivalent factor and the modes of the engine clutch.

The controller may be configured to calculate a plurality of energy consumption amounts of the battery based on at least one of the determined equivalent factor, the status information of the battery or the load information, and calculate a plurality of energy consumption amounts of the engine based on the status information of the engine. The controller may also be configured to calculate the plurality of energy consumption amounts based on the calculated energy consumption amount of the battery and the calculated energy consumption amount of the engine The vehicle may further include an input device configured to receive an input command relating to a fuel efficiency operation. The controller may be configured to determine a first operation mode in which the vehicle is currently being driven in based on the input command, and determine a second operation mode in which to switch to from the first operation mode based on a current speed of the vehicle and the status information of the battery.

The controller may be configured to operate the engine clutch based on the operation mode in which the energy consumption is minimized, the first operation mode, and the second operation mode. The controller may then be configured to select one of a mode change from the first operation mode to the operation mode in which the energy consumption is minimized and a mode change from the first operation mode to the second operation mode. The controller may be configured to select the mode change that corresponds to the first operation mode among the second operation mode and the operation mode in which the energy consumption is minimized.

In accordance with one aspect of the present disclosure, a method for controlling a vehicle having an engine clutch switching between an operation mode including an EV mode for transferring power generated by a motor to wheels and an HEV mode for transferring power generated by an engine and the motor to the wheels may include collecting status information from the motor and the engine; determining an equivalence factor based on status information of a battery and load information using electrical energy of the battery; determining an operation mode in which energy consumption is minimized among a plurality of energy consumption amounts calculated based on the determined equivalent factor and the modes of the engine clutch; and operating the engine clutch based on the operation mode in which the energy consumption is minimized.

The determining of the operation mode in which the energy consumption is minimized may include: calculating a plurality of energy consumption amounts of the battery based on at least one of the determined equivalent factor, the status information of the battery or the load information; and calculating a plurality of energy consumption amounts of the engine based on the status information of the engine. The determining of the operation mode in which the energy consumption is minimized may further include: calculating the plurality of energy consumption amounts based on the calculated energy consumption amount of the battery and the calculated energy consumption amount of engine.

The method may further include receiving an input command that relates to a fuel efficiency operation, determining a first operation mode in which the vehicle is being driven based on the input command, and determining a second operation mode in which to switch to from the first operation mode based on a speed of the vehicle and the status information of the battery.

The operating of the engine clutch may include operating the engine clutch based on the operation mode in which the energy consumption is minimized, the first operation mode, and the second operation mode. The method may further include selecting one of a mode change from the first operation mode to the operation mode in which the energy consumption is minimized and a mode change from the first operation mode to the second operation mode. The selecting may further include selecting the mode change that corresponds to the first operation mode among the second operation mode and the operation mode in which the energy consumption is minimized.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1A:
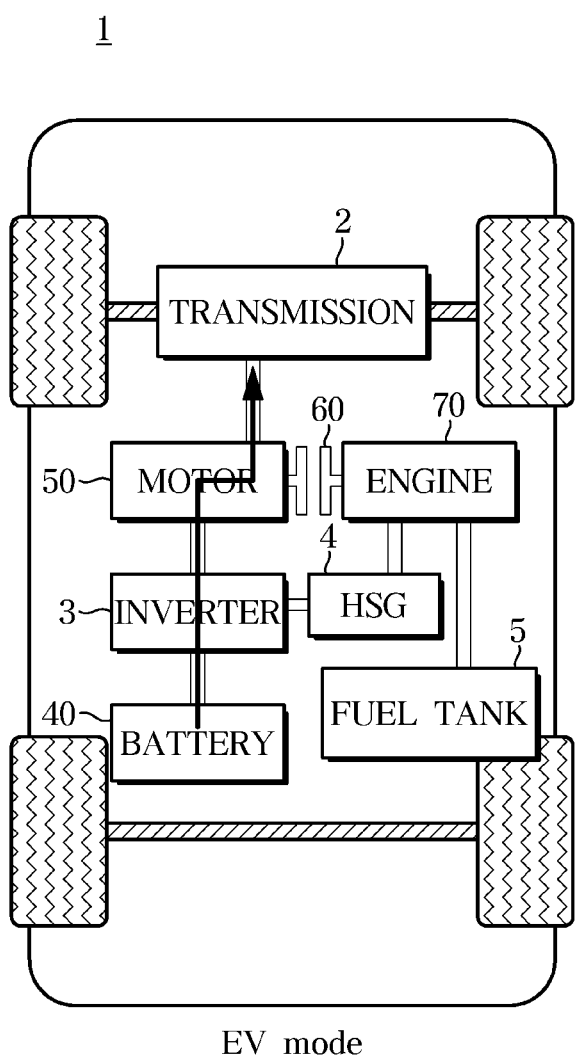
FIGS. 1A-1B are views illustrating operation modes of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements. It will be further understood that the term "connect" or its derivatives refer both to direct and indirect connection, and the indirect connection includes a connection over a wireless communication network.

Reference numerals used for method steps are just used for convenience of explanation, but not to limit an order of the steps. Thus, unless the context clearly dictates otherwise, the written order may be practiced otherwise.

Figure 1B:
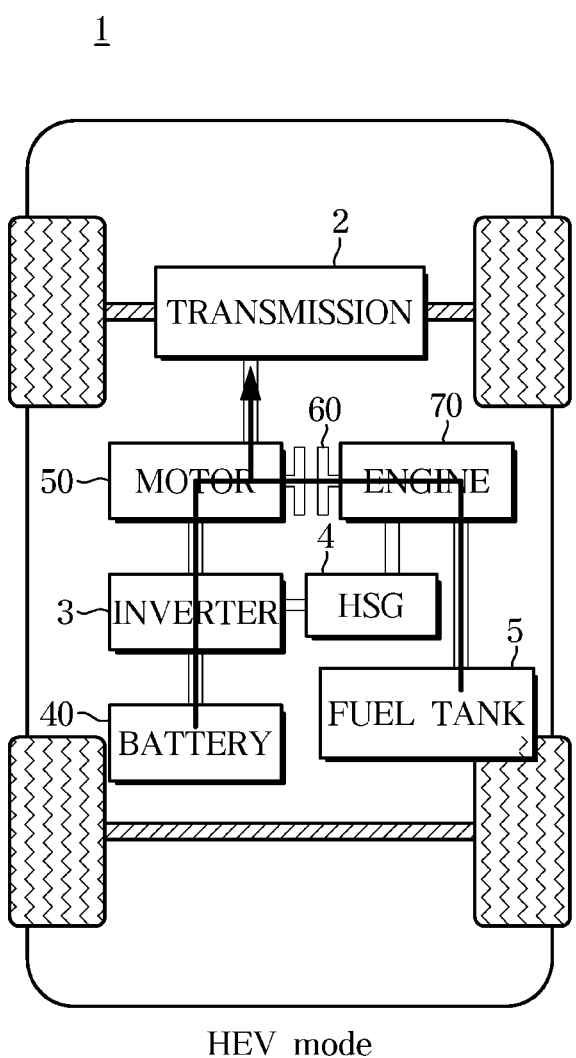
Figure 2:
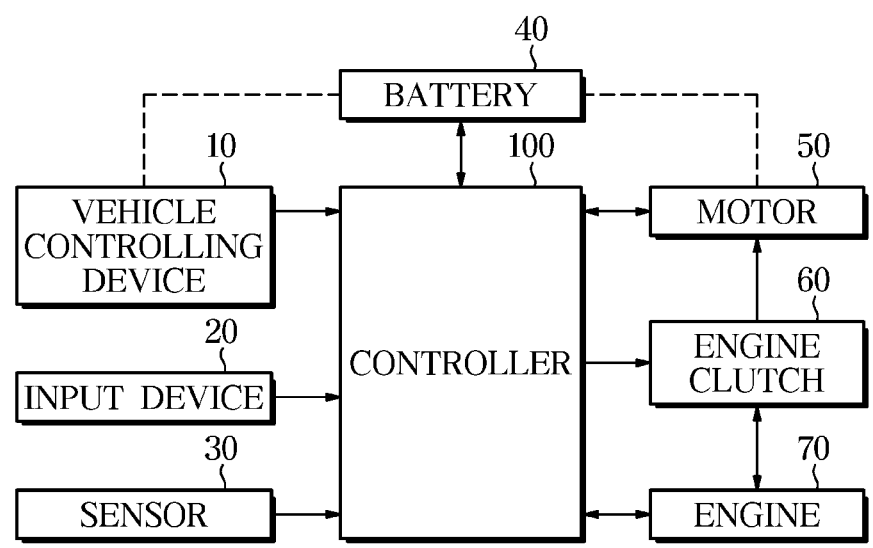
FIG. 2 is a block diagram of a vehicle according to an exemplary embodiment.

The principle and exemplary embodiments of the present invention will now be described with reference to the accompanying drawings. FIGS. 1A-1B illustrate operation modes of a vehicle according to an exemplary embodiment and FIG. 2 is a block diagram of a vehicle according to an exemplary embodiment. To avoid redundant explanations, the following will be described together. Referring to FIGS. 1A-1B, a vehicle 1 may include a transmission 2, an inverter 3, a hybrid starter generator (HSG) 4, a fuel tank 5, a battery 40, a motor 50, an engine clutch 60 and an engine 70.

The transmission 2 may be connected to a wheel 6 to convert power transmitted by the motor 50 and/or the engine 70 into a rotational force required by a user or the vehicle 1. The inverter 3 may include an insulated gate bipolar transistor (IGBT) switch element, which converts direct current (DC) voltage of the battery 40 into three-phase alternating current (AC) voltage according to a pulse width modulation (PWM) control signal generated by a controller 100 (see FIG. 2), and the inverter 3 may be configured to operate the motor 50. The HSG 4 may be configured to start the engine 70 and generate power using the power of the engine 70. The battery 40 may be configured to supply the operating voltage to the motor 50 and may be charged by the regenerative energy generated by the motor 50 during a braking operation.

The engine clutch 60 may be disposed between the motor 50 and the engine 70 and may be operated in an EV mode in which the vehicle 1 is driven only by the motor 50 as a power source or an HEV mode in which the vehicle 1 is driven by the motor 50 and the engine 70 as a power source. Specifically, when the engine clutch 60 is opened, the connection between the motor 50 and the engine 70 is released, and the vehicle 1 may be driven in the EV mode. When the engine clutch 60 is closed, the motor 50 is connected to the engine 70, and the vehicle 1 may be driven in the HEV mode.

Referring to FIG. 2, the vehicle 1 may include a vehicle controlling device 10, an input device 20, a sensor 30, the battery 40, the motor 50, the engine clutch 60, the engine 70 and the controller 100. In particular, the vehicle controlling device 10 may include various electronic components provided within the vehicle 1, and may be supplied with electric power through the battery 40. For example, the vehicle controlling device 10 may be a component using 12V DC voltage, such as a power train, a body, a chassis control device, and a driver assistance system. However, the vehicle controlling device 10 is not limited thereto, and may include electronic components using 48V DC voltage such as an ordinary driving motor, a compressor, and a cooling pump.

The input device 20 may be configured to receive an input command from the user. In particular, the input device 20 may be configured to receive an input command such as a fuel efficiency operation from the user, and transmit the input command to the controller 100. The fuel efficiency operation may include instructions for the vehicle 1 to perform fuel economy in the driving. Specifically, the vehicle 1 consumes fuel due to the operation of the engine clutch 60 in a mode change to switch from the EV mode to the HEV mode. Therefore, when an input command regarding the fuel efficiency operation is received, the vehicle 1 may be configured to collect the status information and then perform the minimum mode change. A detailed description thereof will be given later with reference to other drawings.

The input device 20 may include various hardware devices such as buttons, switches, pedals, a keyboard, a mouse, a track-ball, levers, a handle, a stick and the like, as well as a steering wheel (not shown). In addition, the input command for fuel efficiency operation may be input by the user's touch on a display interlocked with an audio video navigation (AVN) device. In particular, the input unit 20 may be a Graphical User interface (GUI), i.e. software device.

The sensor 30 may be attached to various configurations included in the vehicle 1, and may be configured to collect various information regarding the status of the configuration. For example, the sensor 30 may include an accelerator pedal sensor (APS) corresponding to the power required by the user and a brake pedal sensor (BPS) for measuring the displacement of a brake pedal. The sensor 30 may be configured to measure a current speed and an average speed of the vehicle 1, and measure whether the vehicle 1 is traveling on an inclined plane (e.g., using slope information). The sensor 30 may be configured to detect a temperature inside the vehicle 1 in which the user is located. The detected average speed, the current speed of the vehicle 1, the slope information, and the temperature detection value may be transmitted to the controller 100, and may be used to calculate an equivalence factor to be described later.

Additionally, the sensor 30 may be configured to detect a rotational speed of the motor 50, a torque of the motor 50, RPM of the engine 70 and a torque of the engine 70, or the like. The detection value of the sensor 30 may be transmitted to the controller 100 and may be used to determine an operation mode based on an energy consumption amount. The sensor 30 may further include various sensors in addition to those described above.

The controller 100 may be configured to execute the overall operation of the vehicle by integrally controlling the above-described configuration. Specifically, the controller 100 may be configured to collect status information from the sensor 30, the motor 50, and the engine 70, and determine the operation mode in which energy consumption is minimized among a plurality of energy consumption amounts calculated based on the collected status information and the operation mode of the engine clutch 60.

Particularly, the operation mode may be one of the EV mode and the HEV mode. When the operation mode is determined, the controller 100 may be configured to compare the current operation mode of the vehicle 1 and the determined operation mode, and operate the engine clutch 60 in response to determining that the operation mode should be changed. A detailed description of a controlling method of the vehicle will be given later with reference to other drawings.

The controller 100 may include a memory to store algorithms for executing the operations of components of the vehicle 1 or data regarding programs for executing the algorithms, and a processor to perform the above-described operations using the data stored in the memory. In various exemplary embodiments, the memory and the processor are implemented as separate chips, and in other exemplary embodiments the memory and the processor are implemented on a single chip.

Figure 3:
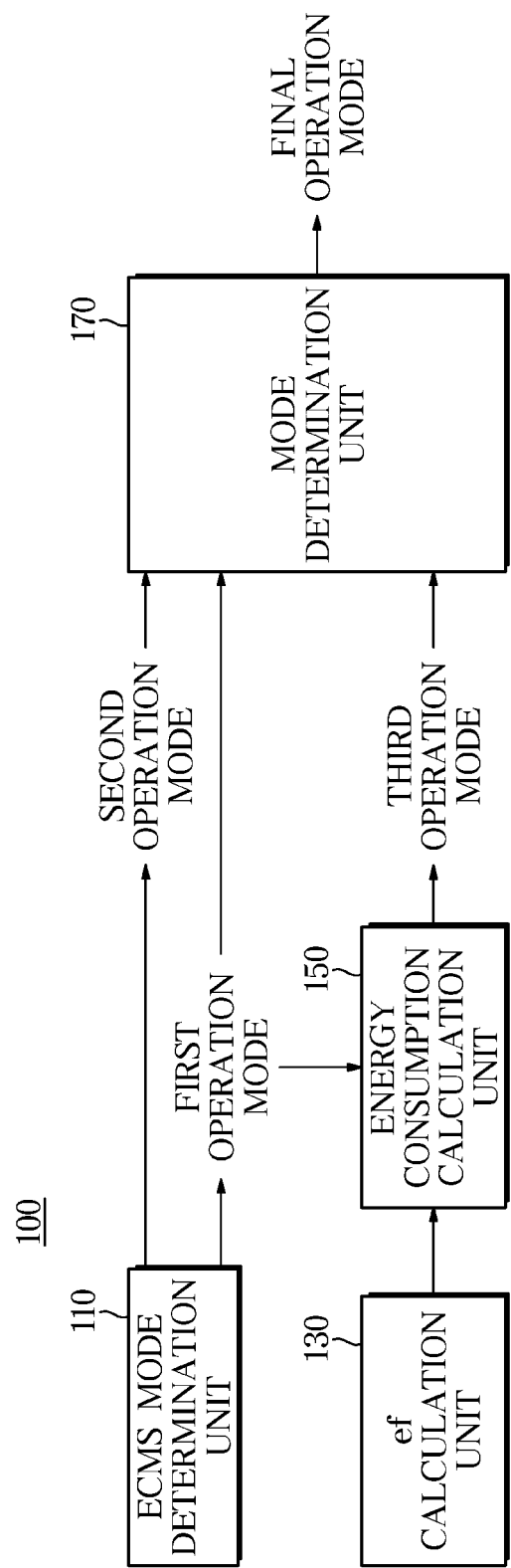
FIG. 3 illustrates a method for a controller to determine an operation mode according to an exemplary embodiment.
Figure 4:
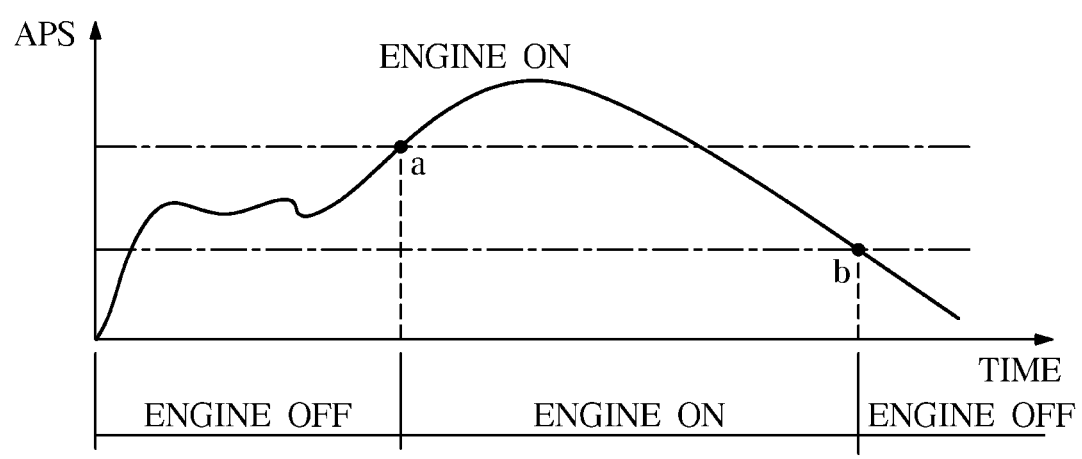
FIG. 4 is a diagram related to an ECMS mode determination unit according to an exemplary embodiment.

In addition to the above-described configuration in FIGS. 1A-1B and 2, the vehicle 1 may further include various configurations. FIG. 3 illustrating a method for a controller to determine an operation mode according to an exemplary embodiment. FIG. 4 is a diagram related to an equivalent consumption minimization strategy (ECMS) mode determination unit.

Referring to FIG. 3, the controller 100 may be divided into an ECMS mode determination unit 110, an ef calculation unit 130, an energy consumption calculation unit 150, and a mode determination unit 170. First, the ECMS mode determination unit 110 may be configured to determine an operation mode (hereinafter a first operation mode) in which the vehicle 1 is currently traveling in and an operation mode (hereinafter a second operation mode) to be changed in the first operation mode. Specifically, the ECMS mode determination unit 110 may be configured to determine the second operation mode based on the current speed of the vehicle 1 and the status information of the battery 40.

Referring to FIG. 4, the ECMS mode determination unit 110 may be configured to determine whether to turn the engine 70 on or off in response to the APS detected by the sensor 30. In other words, when the APS is low, only the motor 50 is operated (EV mode), and when the APS is high, the engine 70 is operated (HEV mode). Here, the reference points (a, b) that may be corresponded to the requested power may be determined by rule-based logic. In other words, the engine 70 may be turned on when the APS is greater than the point a, and the engine 70 may be turned off when the APS is less than the point b.

The ECMS mode determination unit 110 may be configured to adjust the points a and b based on the current speed of the vehicle 1 and the status information of the battery 40. The vehicle 1 may be configured to minimize the final fuel consumption when operating instantaneous energy consumption of the two power sources (the motor 50 and the engine 70) to a minimum. In particular, since the motor 50 and the engine 70 have different dimensions, an equivalent factor is required. The ECMS mode determination unit 110 may the equivalent factor (ef) included in Equation 1 to minimize the energy consumption.

$$\text{Min(Energy Consumption)} = \text{Instantaneous Fuel Consumption} + ef^*\text{Instantaneous SOC Consumption} \quad \text{Equation 1:}$$

The ECMS mode determination unit 110 may be configured to multiply the equivalent factor determined by the SOC consumption charged in the battery 40, and then, determine whether a mode change is performed based on the energy consumption amount that is the smallest among the fuel consumption of the engine 70. In particular, the equivalent factor is a variable based on the situation. When the state of charge (SOC) of the battery 40 is about 90% or greater, the ECMS mode determination unit 110 may be configured to determine the value of the electrical energy charged in the battery 40 to be less than that of the fuel. Alternatively, when the remaining amount of the electrical energy is small, the ECMS mode determination unit 110 may be configured to determine the magnitude of the equivalent factor to be high. In other words, the ECMS mode determination unit 110 may be configured to adjust the equivalence factor corresponding to the SOC.

The ECMS mode determination unit 110 may be configured to determine the instantaneous fuel consumption through the speed of the vehicle 1, and determine the instantaneous SOC consumption and the equivalent factor through the status information of the battery 40. Then the ECMS mode determination unit 110 may be configured to determine whether a mode conversion is performed to minimize the energy consumption.

As shown from Equation 1, since the ECMS mode determination unit 110 considers only the energy efficiency, there is an inefficient aspect when the mode change is applied to various TMED HEVs. Accordingly, the controller 100 may be configured to determine whether the mode is changed based on various status information of the vehicle 1 in parallel with the determination of the ECMS mode determination unit 110, and then determine the final operation mode.

Figure 5:
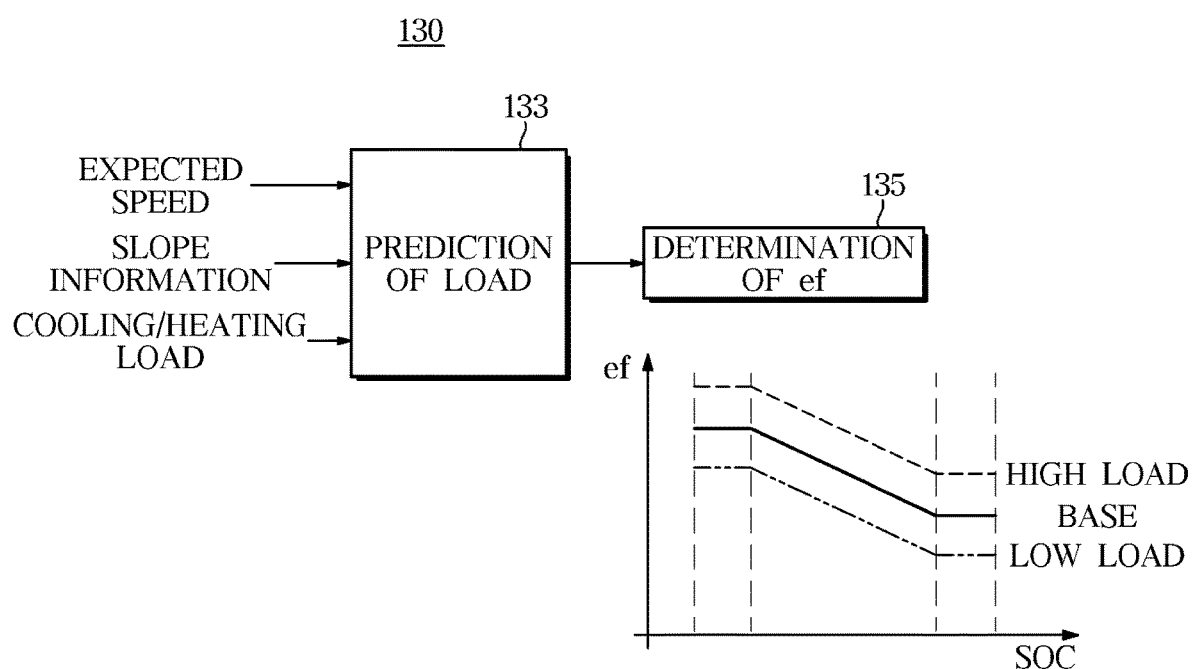
FIG. 5 illustrates the operation of an of calculation unit according to an exemplary embodiment.

FIG. 5 illustrating the operation of the ef calculation unit 130. The ef calculation unit 130 may be configured to collect load information and determine whether the consumption amount of the electrical energy charged in the battery 40 is excessive based on the collected load information (133) and newly determine an equivalent factor (135). First, the ef calculation unit 130 may be configured to collect various status information from the vehicle controlling device 10 or the sensor 30, and calculate the load information from the status information. Particularly, the load information may include various factors consuming the electrical energy of the battery 40. For example, the load information may include an expected speed, the slope information, and a cooling/heating load.

Specifically, the expected speed may be determined by the difference between the average speed of the vehicle 1 while being driven and the current speed of the vehicle 1. The average speed and the current speed of the vehicle 1 may be collected by the sensor 30 and the ef calculation unit 130 may be configured to calculate the expected speed based on the collected average speed and the current speed of the vehicle 1. The slope information may be determined by navigation information and the status information detected by the sensor 30. The ef calculation unit 130 may be configured to determine that the vehicle 1 is being driven on the inclined plane based on the collected information.

The cooling/heating load may be determined by the temperature inside or outside the vehicle 1 that is collected by the sensor 30 and an air conditioner. In addition, the ef calculation unit 130 may be configured to collect load information and various information contributing to the consumption of the electrical energy charged in the battery 40. The ef calculation unit 130 may be configured to synthesize the collected load information to predict a near future load. When the vehicle 1 is ascending on a slope in winter or during colder temperatures, the ef calculation unit 130 may be configured to predict that the battery 40 will use excessive electrical energy corresponding to an external temperature and operation of the air conditioner. The ef calculation unit 130 may be configured to predict a 'high load' based on the current status information.

Additionally, the ef calculation unit 130 may be configured to set an equivalence factor based on a different criterion from the ECMS mode determination unit 110, that is, the prediction of the load. When the energy consumption of the battery 40 is expected to be large based on the load information, the ef calculation unit 130 may be configured to set the value of the SOC of the battery 40 higher. Eventually, the ef calculation unit 130 may be configured to determine the equivalent factor based on the status information of the battery 40 and also the load information using the electrical energy of the battery 40, and supply the determined equivalent factor to the energy consumption calculation unit 150.

Figure 6:
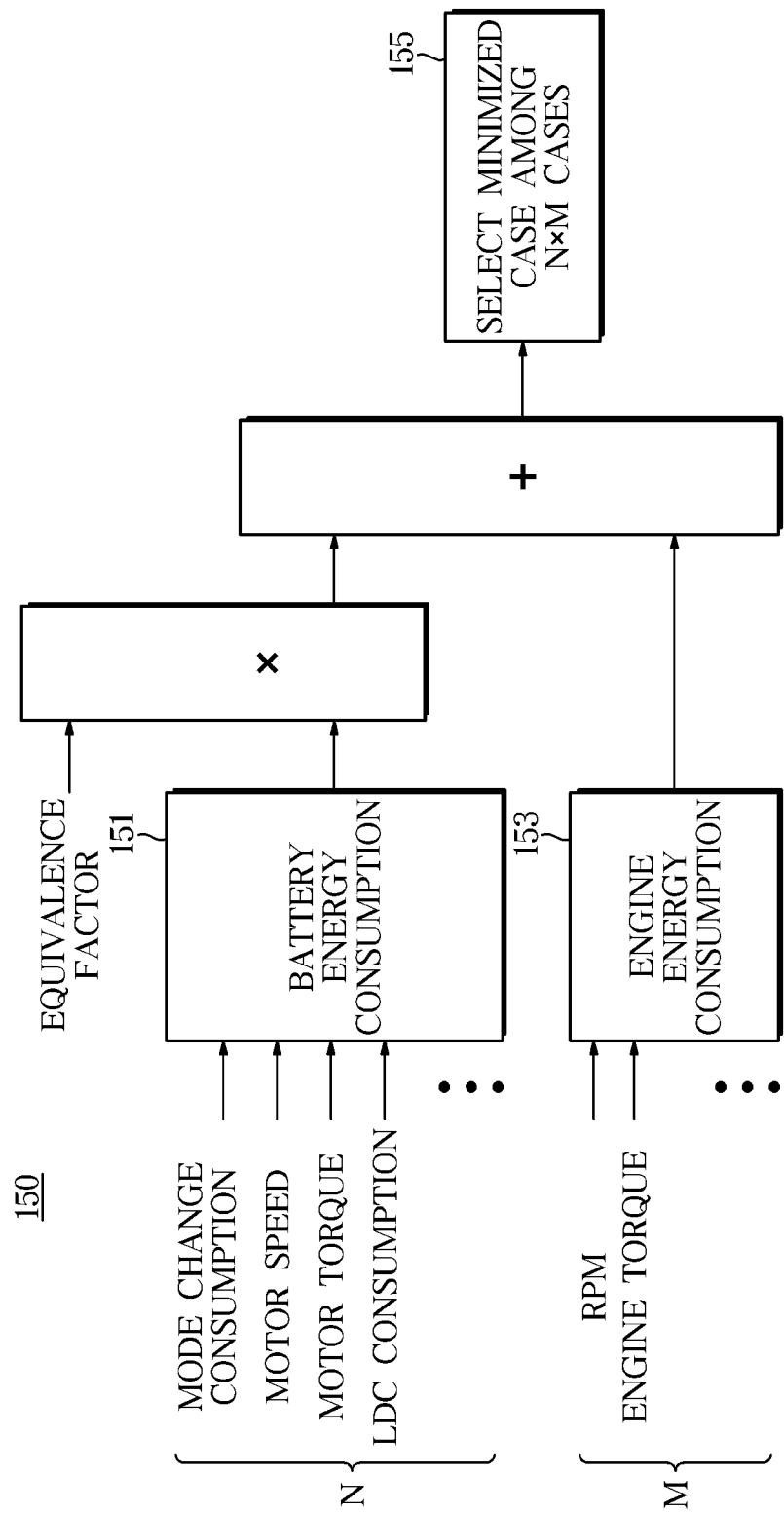
FIG. 6 illustrates the operation of an energy consumption calculation unit according to an exemplary embodiment.

FIG. 6 illustrates the operation of an energy consumption calculation unit. Referring to FIG. 6, the energy consumption calculation unit 150 may be configured to calculate the energy consumption by multiplying battery energy consumption (151) by the determined equivalent factor, and then adding the resultant value to engine energy consumption (153).

Unlike the ECMS mode determination unit 110, the energy consumption calculation unit 150 may be configured to calculate a plurality of energy consumption amounts based on various status information and select the energy consumption amount that is the smallest among the plurality of energy consumption amounts (155). Specifically, the energy consumption calculation unit 150 may be configured to calculate the battery energy consumption for a plurality of (N) cases such as mode change consumption, a motor speed, a motor torque, and LDC (Low DC) consumption. Then, the energy consumption calculation unit 150 may be configured to multiply a plurality of the (N) cases of battery consumption amounts by the equivalence factor determined by the of calculation unit 130.

For example, the mode change consumption refers to the amount of energy used by the battery 40 when the vehicle 1 changes from the EV mode to the HEV mode. The motor speed refers to the energy consumption of the battery 40 required for the operation of the motor 50. The motor torque refers to the energy consumption of the battery 40 to be used by the motor 50 based on the required power. The LDC consumption refers to the energy consumption of the battery 40 to be required by the vehicle controlling device 10 using 12V DC voltage.

On the other hand, the energy consumption calculation unit 150 may be configured to calculate a plurality of (M) cases of the engine energy consumption based on the status information, similarly to the calculation of the battery energy consumption. For example, the energy consumption calculation unit 150 may be configured to calculate the engine energy consumption based on the status information such as the revolutions per minute (RPM) and the engine torque.

The energy consumption calculation unit 150 may be configured to calculate a plurality of (N×M) energy consumption through the calculated battery energy consumption, the determined equivalent factor, and the calculated energy consumption. The energy consumption calculation unit 150 may be configured to select a case that is the smallest amount among the plurality of calculated (N×M) energy consumption, and determine whether the mode conversion of the vehicle 1 is performed based on the selected energy consumption. The energy consumption calculation unit 150 may be configured to transmit the determined operation mode (third operation mode) to the mode determination unit 170.

Figure 7:
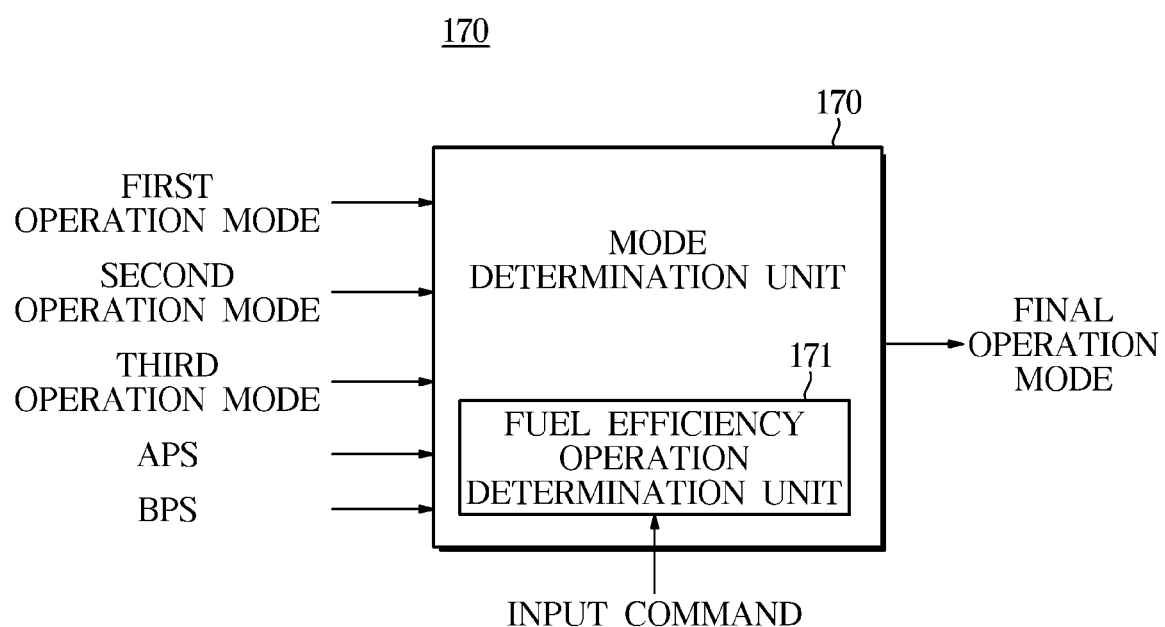
FIG. 7 illustrates the operation of a mode determination unit according to an exemplary embodiment.

FIG. 7 illustrating the operation of a mode determination unit. Referring to FIG. 7, the mode determination unit 170 may be configured to collect all of the first operation mode, the second operation mode, and the third operation mode and then determine which of the mode operations is the final mode. In particular, the first operation mode refers to the operation mode in which the vehicle 1 is being driven. The second operation mode refers to the mode conversion determined by the ECMS mode determination unit 110 and the third operation mode refers to the mode conversion determined by the energy consumption calculation unit 150.

The mode determination unit 170 may be configured to determine whether to perform the fuel efficiency operation based on the user's input command, APS, BPS, or the like (171). When it is not necessary to perform the fuel consumption operation, the mode determination unit 170 may be configured to determine the second operation mode as the final mode. When the mode determination unit 170 determines that the fuel consumption operation is necessary, the mode determination unit 170 may be configured to select one of the second operation mode and the third operation mode. Specifically, the mode determination unit 170 may be configured to select one of the second operation mode and the third operation mode based on the mode change becoming a minimum.

For example, the mode determination unit 170 may be configured to receive a notification that the first operation mode is the EV mode, the second operation mode is the HEV mode, and the third operation mode is the EV mode. The mode determining unit 170 may then be configured to select the third operation mode since there is no mode change of the first operation mode in the third operation mode. As another example, the mode determination unit 170 may be configured to receive a notification that the first operation mode is the EV mode, the second operation mode is the HEV mode, and the third operation mode is the HEV mode. The mode determining unit 170 may then be configured to determine the HEV mode as the final mode since both the second operation mode and the third operation mode are the same.

Figure 8:
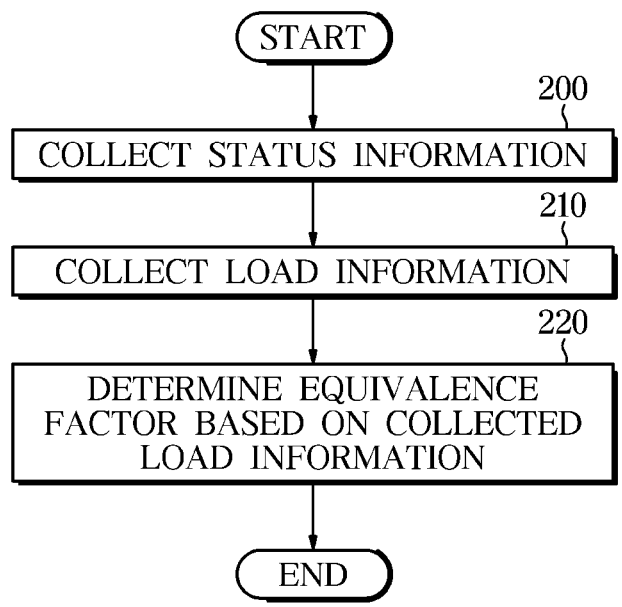
FIG. 8 is a flowchart of a method for determining an equivalence factor according to an exemplary embodiment.

Meanwhile, the configurations of FIGS. 5 to 7 are classified for convenience of explanation of the controller 100, and the technical idea is not limited by the terms and names FIG. 8 is a flowchart of a method for determining an equivalence factor according to one embodiment. Referring to FIG. 8, the controller 100 may be configured to collect the status information (200).

Particularly, there may be various configurations of the status information, and the controller 100 may be configured to request the various configurations of the vehicle 1 with information necessary for calculating the load information. The controller 100 may be configured to collect the load information (210). The load information may be determined based on the collected status information, and the load information itself may be collected from the sensor 30. The load information according to an example may include the expected speed, the slope information, and the cooling/heating load, and may be determined based on elements using electrical energy of the battery 40.

When the load information is calculated, the controller 100 may be configured to determine the equivalence factor based on the collected load information (220). When it is predicted that the load information uses more electrical energy of the battery 40, the controller 100 may be configured to adjust the equivalent factor upward. When it is predicted that the load information uses less electrical energy of the battery 40, the equivalent factor may be adjusted downward.

Figure 9:
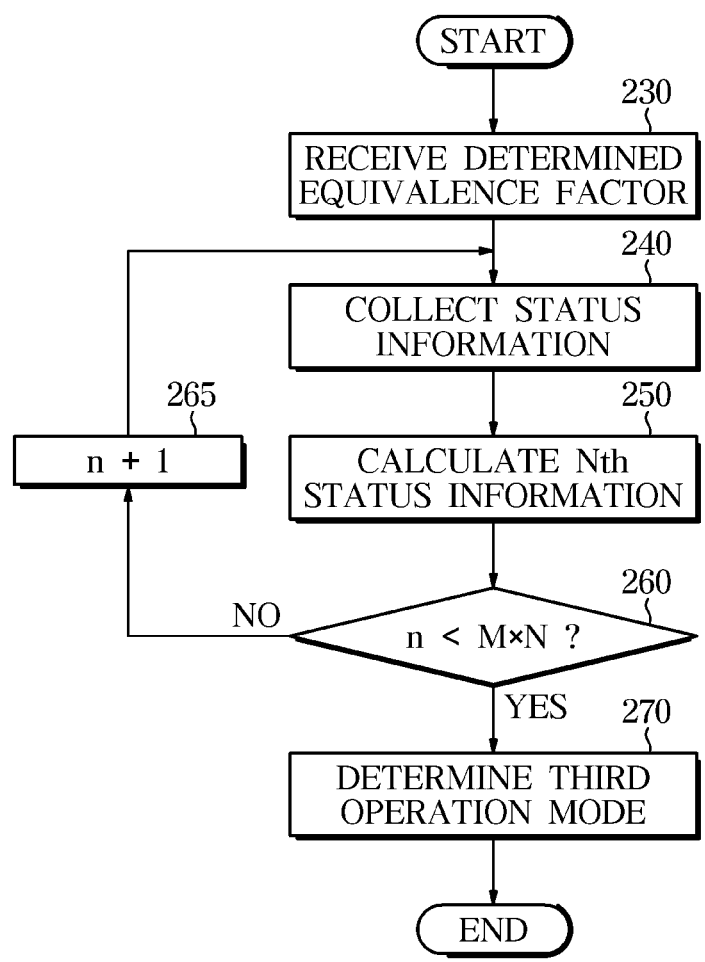
FIG. 9 is a flowchart of a method for determining a third operation mode in accordance with an exemplary embodiment.

FIG. 9 is a flowchart of a method for determining a third operation mode in accordance with an exemplary embodiment. Referring to FIG. 9, the controller 100 may be configured to receive the determined equivalence factor (230). Specifically the determined equivalence factor may be stored in a memory and the controller 100 may access the data in which the equivalence factor is stored, if necessary.

The controller 100 may be configured to collect status information (240). The status information may be very diverse, and the total energy consumption may be calculated for each piece of status information (250). When the amount of energy consumed by the battery 40 is N and the amount of energy consumed by the engine 70 is M, the controller 100 may be configured to calculate N*M energy consumption (265). When all of the plurality (N*M) of the energy consumption are calculated, the controller 100 may be configured to determine the third operation mode based on the nth case in which the energy consumption is minimized (270).

Figure 10:
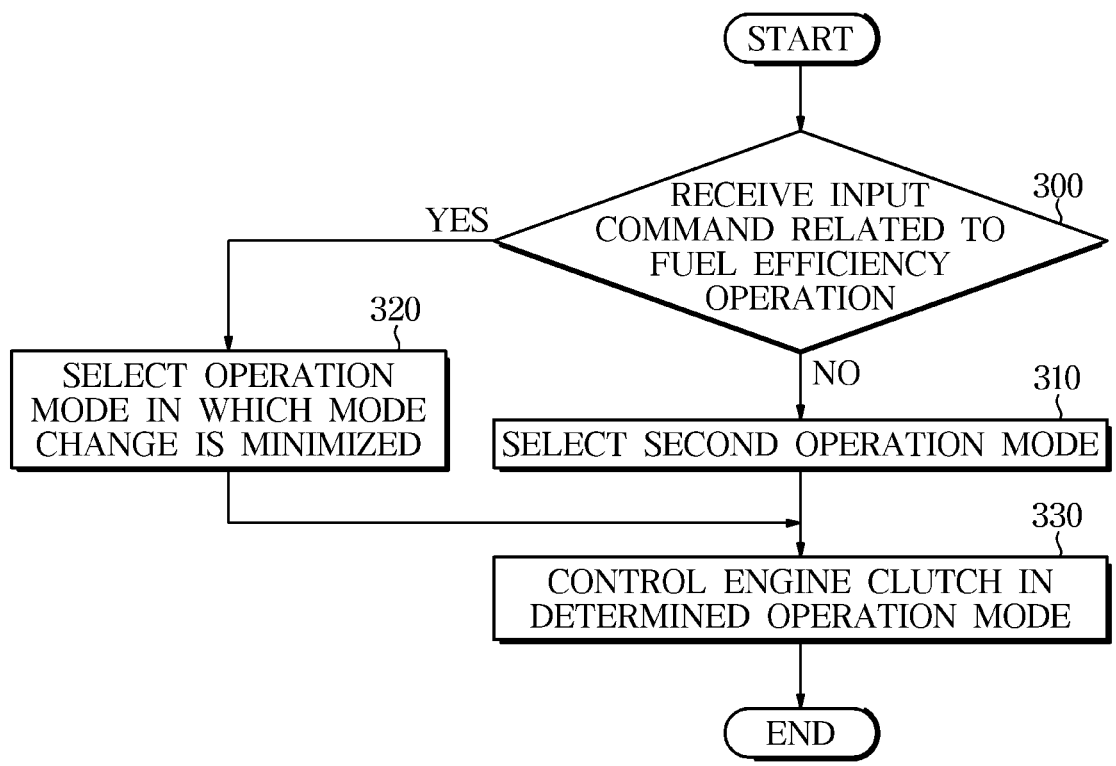
FIG. 10 is a flowchart of a method for determining a final operating mode in accordance with an exemplary embodiment.

FIG. 10 is a flowchart of a method for determining a final operating mode in accordance with an exemplary embodiment. Referring to FIG. 10, the controller 100 may be configured to determine whether the engine 70 receives an input command related to the fuel efficiency operation according to an exemplary embodiment (300). For example, the user may transmit an input command regarding the fuel consumption while the vehicle 1 is being driven. When the input command is transmitted, the vehicle 1 may be configured to select an operation mode in which a mode change is minimized (320).

The operation mode in which the mode change is minimized indicates that the mode change from the first operation mode to the second operation mode is compared with the mode change from the first operation mode to the third operation mode. When an input command is not received, the controller 100 may be configured to select the second operation mode (310) and operate the engine clutch 60 in the determined operation mode (330). On the other hand, the controller 100 may be configured to determine a decision regarding the fuel consumption based on the status information of the vehicle 1 without the user's input command.

According to one aspect of the present invention, the vehicle 1 may reduce the energy consumption and improve the fuel economy for a power distribution strategy performed by the TMED HEV by considering additional status information in addition to the ECMS logic. According to another aspect of the present invention, the vehicle 1 may improve a shift feeling by performing a power distribution strategy in consideration of the driving performance of a user. According to an additional aspect of the present invention, the vehicle 1 may prevent damage to the engine by reducing frequent turn-on/off of the engine.

What is claimed is:

1. A vehicle, comprising:
   an engine;
   a motor operating with electrical energy of a battery;
   an engine clutch for switching between an operation mode including an electric vehicle (EV) mode for transferring power generated by the motor to wheels and a hybrid electric vehicle (HEV) mode for transferring power generated by the engine and the motor to the wheels; and
   a controller configured to collect status information from the motor and the engine, determine an equivalence factor based on status information of the battery and load information using the electrical energy of the battery and determine an operation mode in which energy consumption is minimized among a plurality of energy consumption amounts calculated based on the determined equivalent factor and the operation modes of the engine clutch.

2. The vehicle according to claim 1, wherein the controller is configured to:
   calculate a plurality of energy consumption amounts of the battery based on at least one of the determined equivalent factor, the state information of the battery or the load information; and
   calculate a plurality of energy consumption amounts of the engine based on the state information of the engine.

3. The vehicle according to claim 2, wherein the controller is configured to:
   calculate the plurality of energy consumption amounts based on the calculated energy consumption amount of the battery and the calculated energy consumption amount of the engine.

4. The vehicle according to claim 1, further comprising:
   an input device configured to receive an input command relating to a fuel economy operation.

5. The vehicle according to claim 4, wherein the controller is configured to:
   determine a first operation mode in which the vehicle is currently being driven in based on the input command; and
   determine a second operation mode in which to switch to from the first operation mode based on a current speed of the vehicle and the state information of the battery.

6. The vehicle according to claim 5, wherein the controller is configured to:
   operate the engine clutch based on the operation mode in which the energy consumption is minimized, the first operation mode, and the second operation mode.

7. The vehicle according to claim 6, wherein the controller is configured to:
   select one of a mode change from the first operation mode to the operation mode in which the energy consumption is minimized and a mode change from the first operation mode to the second operation mode.

8. The vehicle according to claim 7, wherein the controller is configured to:
   select the mode change that corresponds to the first operation mode among the second operation mode and the operation mode in which the energy consumption is minimized.

9. A method for controlling a vehicle having an engine clutch switching between an operation mode including an electric vehicle (EV) mode for transferring power generated by a motor to wheels and a hybrid electric vehicle (HEV) mode for transferring power generated by an engine and the motor to the wheels, the method comprising:
   collecting, by a controller, status information from the motor and the engine;
   determining, by the controller, an equivalence factor based on status information of a battery and load information using electrical energy of the battery;
   determining, by the controller, an operation mode in which energy consumption is minimized among a plurality of energy consumption amounts calculated based on the determined equivalent factor and the modes of the engine clutch; and
   operating, by the controller, the engine clutch based on the operation mode in which the energy consumption is minimized.

10. The method according to claim 9, wherein the determining of the operation mode in which the energy consumption is minimized includes:
    calculating, by the controller, a plurality of energy consumption amounts of the battery based on at least one of the determined equivalent factor, the state information of the battery or the load information; and
    calculating, by the controller, a plurality of energy consumption amounts of the engine based on the state information of the engine.

11. The method according to claim 10, wherein the determining of the operation mode in which the energy consumption is minimized includes:
    calculating, by the controller, the plurality of energy consumption amounts based on the calculated energy consumption amount of the battery and the calculated energy consumption amount of engine.

12. The method according to claim 9, further comprising:
    receiving, by the controller, an input command relating to a fuel economy operation.

13. The method according to claim 12, further comprising:
    determining a first operation mode in which the vehicle is traveling based on the input command, and
    determining a second operation mode in which to switch to from the first operation mode based on a speed of the vehicle and the state information of the battery.

14. The method according to claim 13, wherein the operating of the engine clutch includes:

operating, by the controller, the engine clutch based on the operation mode in which the energy consumption is minimized, the first operation mode, and the second operation mode.

15. The method according to claim 14, wherein the controlling operating of the engine clutch includes:
selecting, by the controller, one of a mode change from the first operation mode to the operation mode in which the energy consumption is minimized and a mode change from the first operation mode to the second operation mode.

16. The method according to claim 15, wherein the selecting includes:
selecting, by the controller, the mode change that corresponds to the first operation mode among the second operation mode and the operation mode in which the energy consumption is minimized.

\* \* \* \* \*